March 31, 1936. S. V. LAUB ET AL 2,035,709

TOOTH BRUSH AND MANUFACTURE THEREOF

Filed July 8, 1932 9 Sheets-Sheet 1

INVENTORS.
Stanley V. Laub,
Harold L. Kegler.
BY
Harness, Dickey, Pierce & Harris
ATTORNEYS.

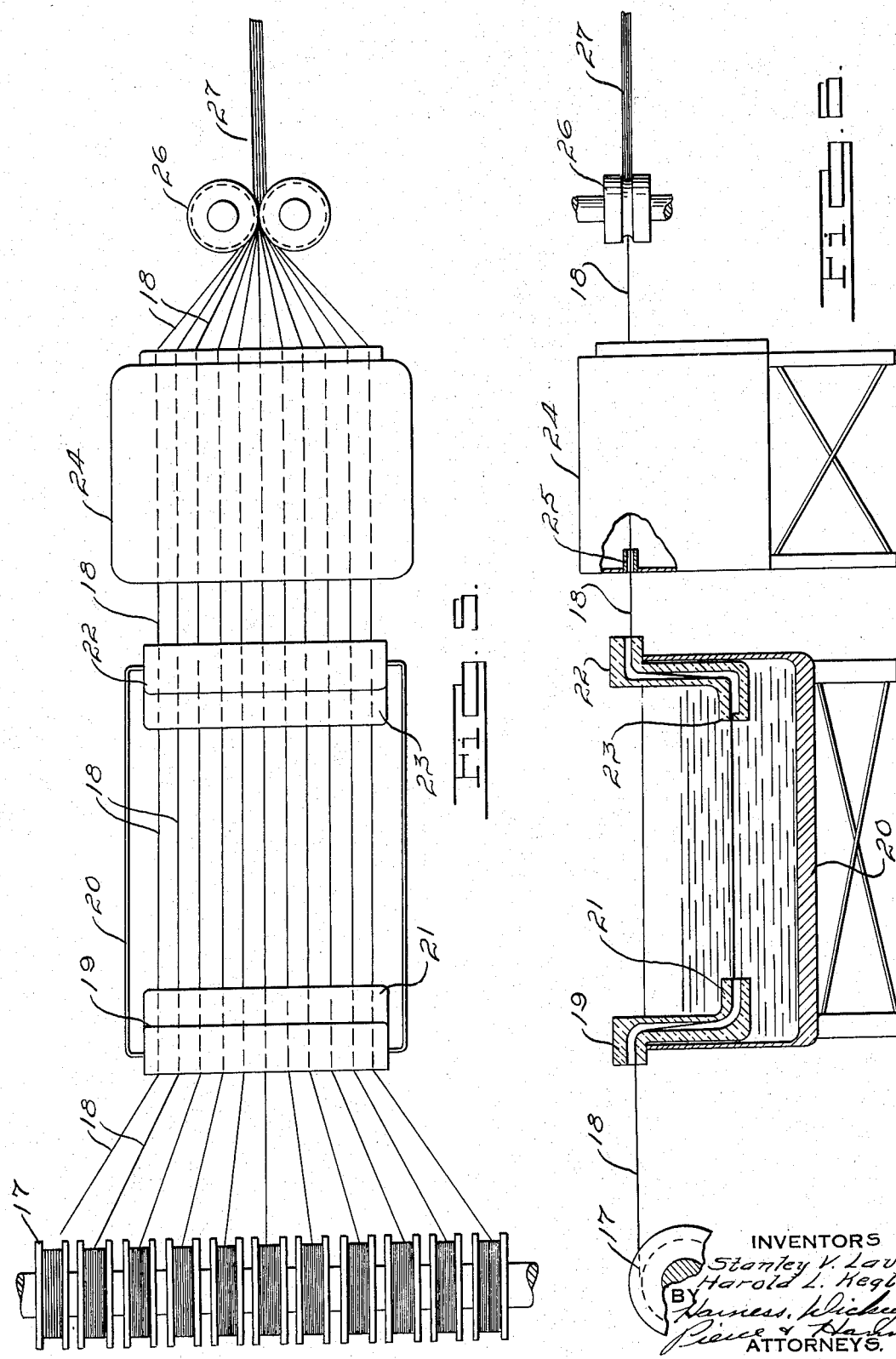

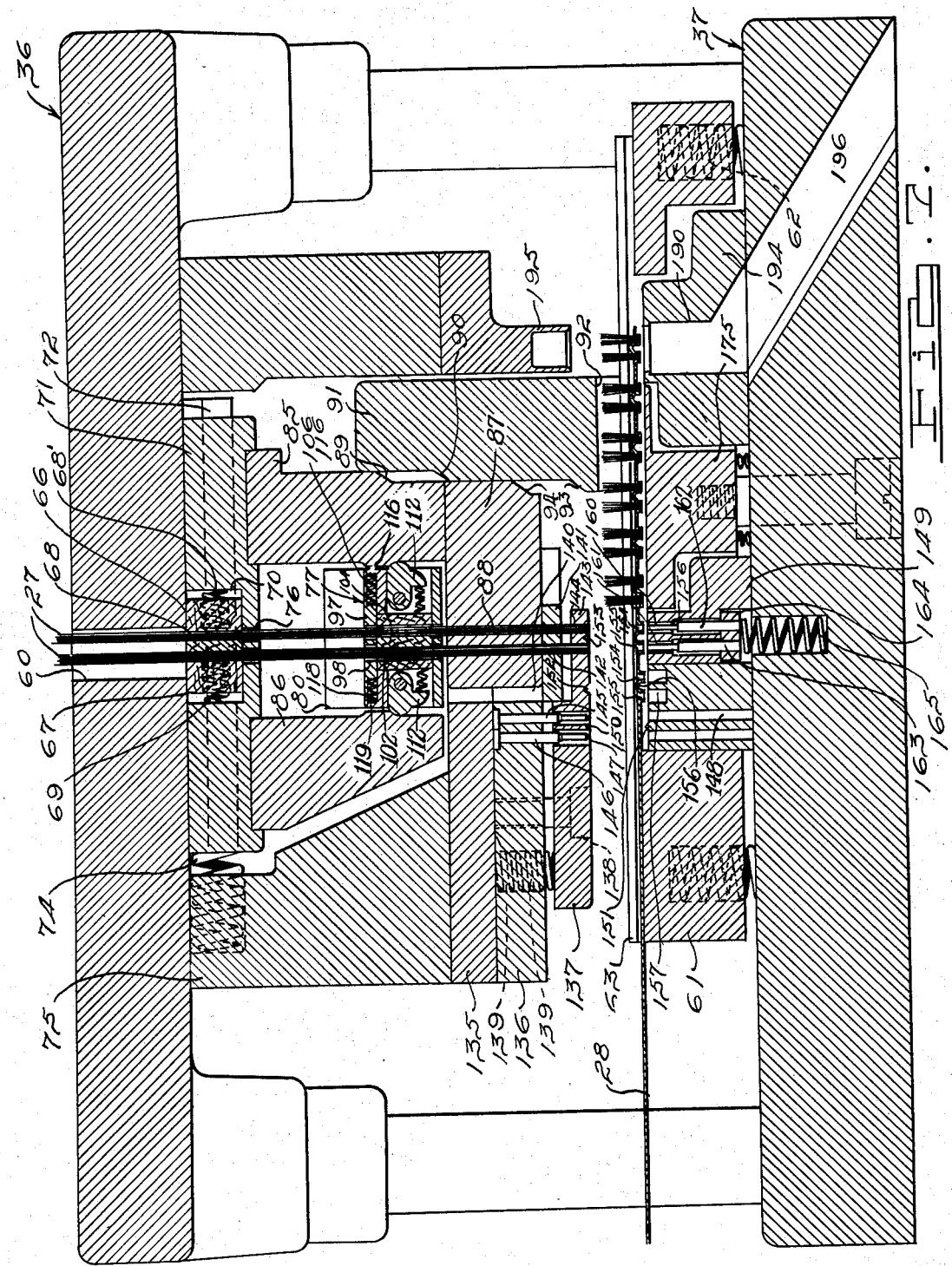

March 31, 1936.  S. V. LAUB ET AL  2,035,709
TOOTH BRUSH AND MANUFACTURE THEREOF
Filed July 8, 1932  9 Sheets-Sheet 4
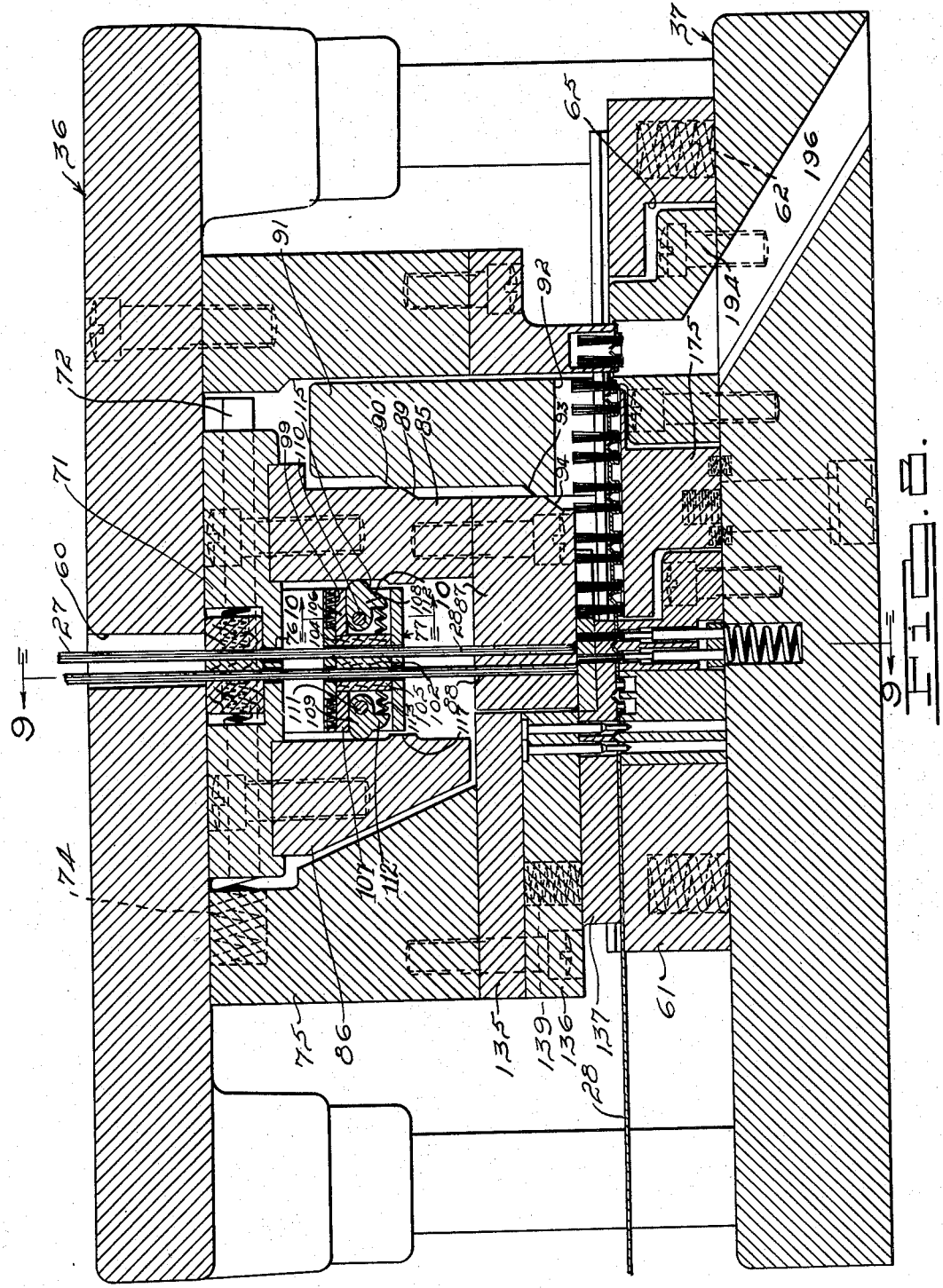
INVENTORS.
Stanley V. Laub,
Harold L. Hegler,
BY
Harness, Dickey, Pierce & Harris
ATTORNEYS.

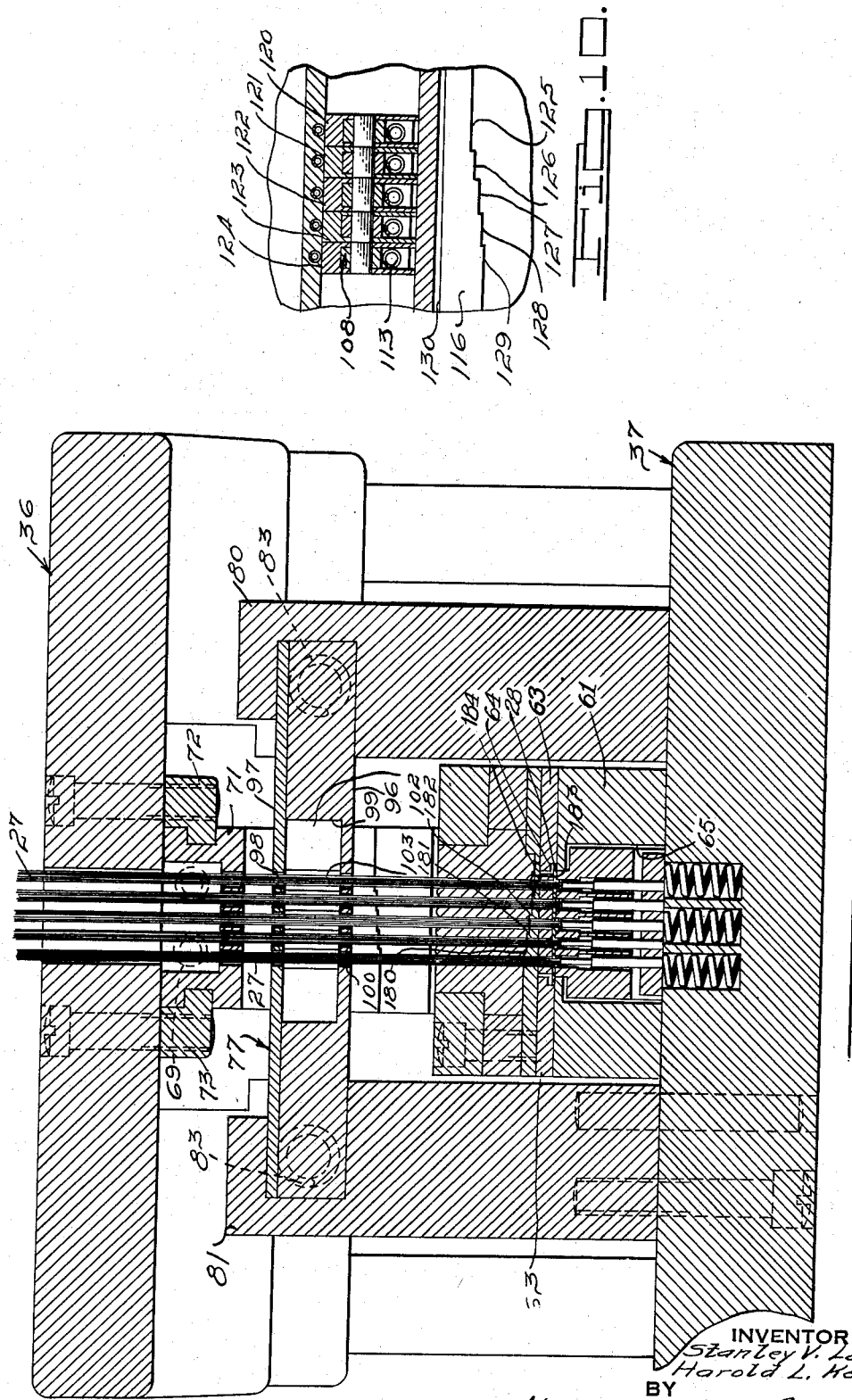

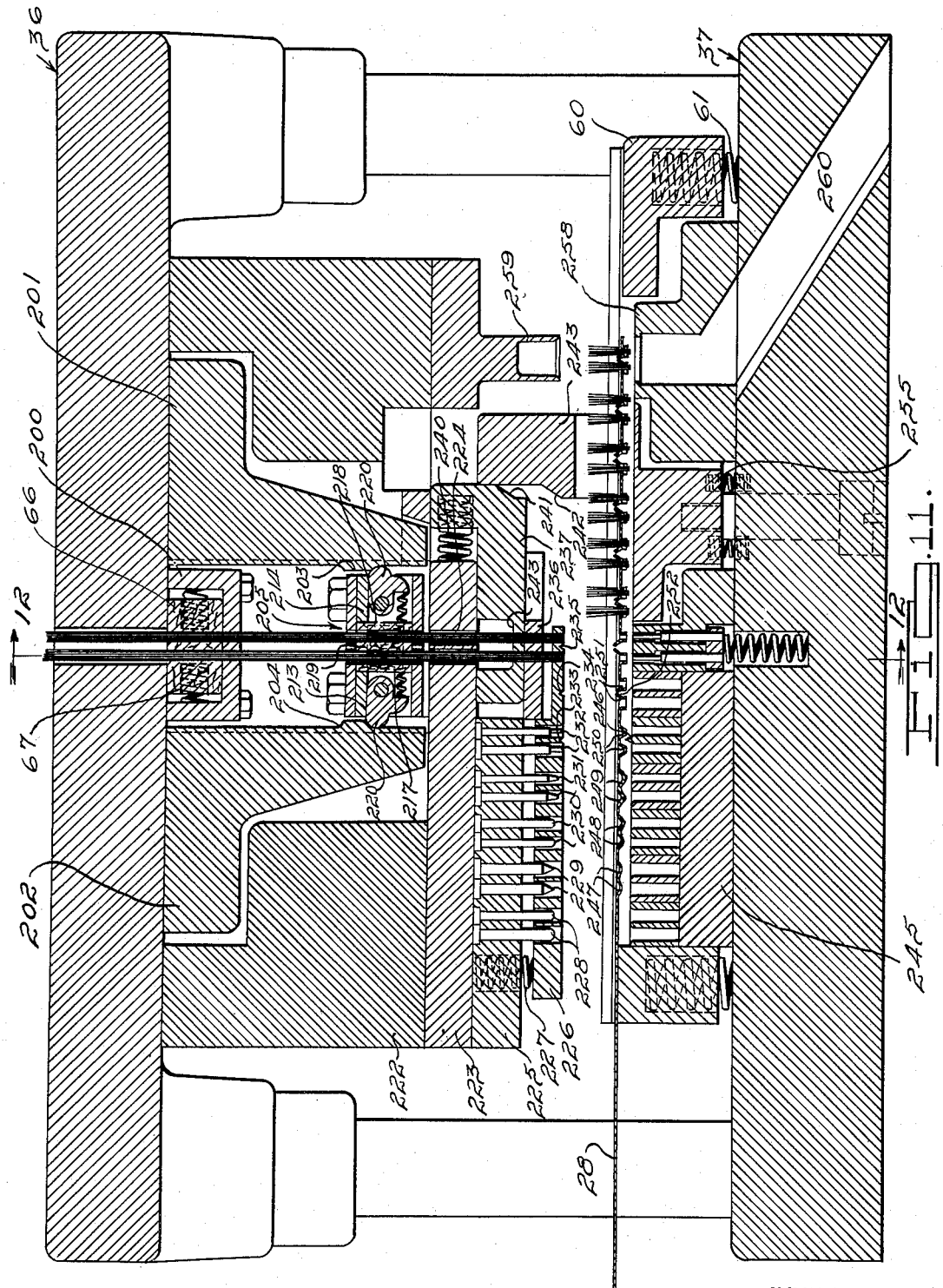

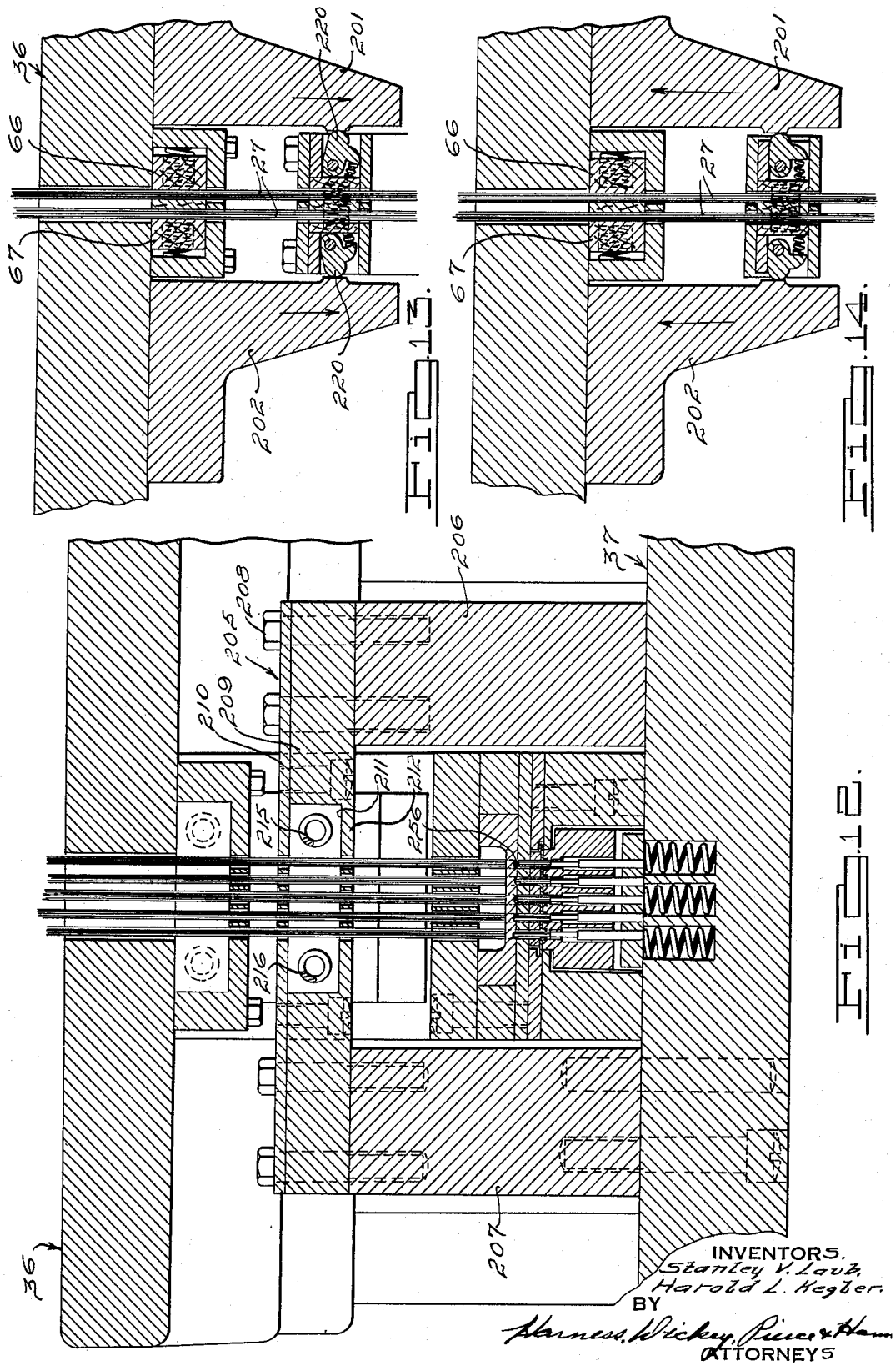

March 31, 1936. S. V. LAUB ET AL 2,035,709

TOOTH BRUSH AND MANUFACTURE THEREOF

Filed July 8, 1932  9 Sheets-Sheet 8

INVENTORS.
Stanley V. Laub,
Harold L. Hegler.
BY
ATTORNEYS.

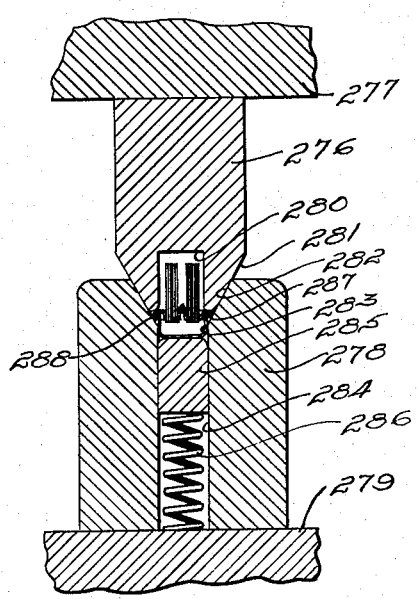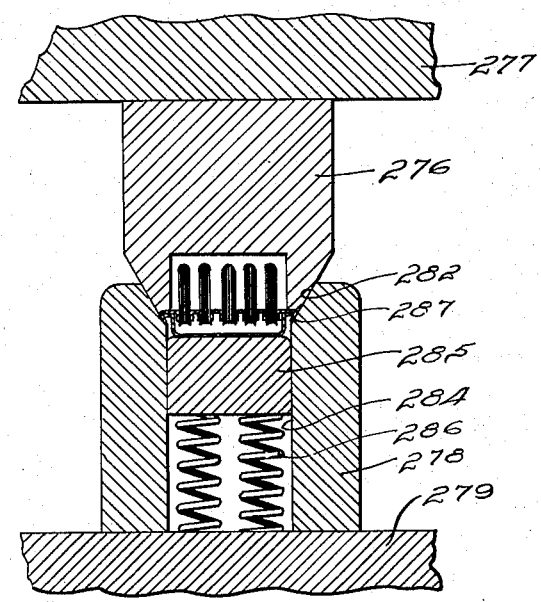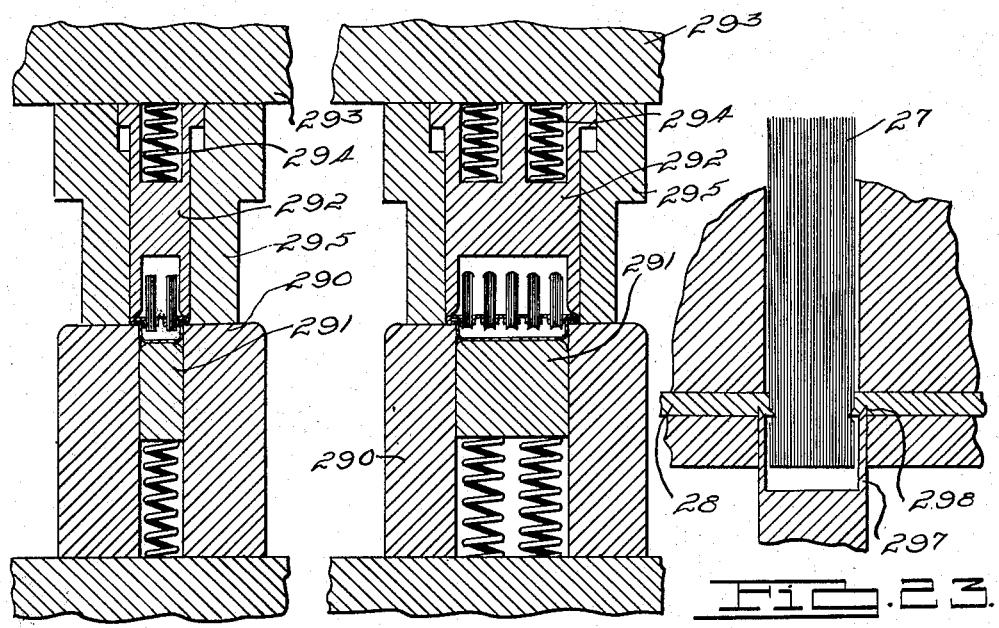

Patented Mar. 31, 1936

2,035,709

UNITED STATES PATENT OFFICE 2,035,709

TOOTH BRUSH AND MANUFACTURE THEREOF

Stanley V. Laub, Detroit, and Harold L. Kegler, Lincoln Park, Mich.; said Kegler assignor to said Laub Application July 8, 1932, Serial No. 621,428

54 Claims. (Cl. 300—4)

The invention relates to the manufacture of brushes and it has particular relation to a tooth brush, and method and apparatus for making it.

One object of the invention is to provide a method of manufacturing an article of the above designated character wherein bristles may be inserted into and set in a bristle plate or head, in a very economical manner.

Another object of the invention is to provide a method of manufacturing an article such as set forth above, wherein the bristle stock is of continuous character, and bristles of proper length from this stock are inserted into and set in bristle plates or heads in a rapid and automatic manner.

Another object of the invention is to provide a method of manufacturing bristle stock from continuous material such as cotton thread, rayon and the like.

Another object of the invention is to provide a method of manufacturing bristle stock in the aforesaid manner and setting predetermined lengths of such stock in bristle plates or heads in a substantially continuous and automatic manner.

Another object of the invention is to provide an economical and efficient method of manufacturing a brush having a small quantity of housed tooth paste associated therewith.

Another object of the invention is to provide an efficient method of manufacturing brush bristles from thread or the like.

Another object of the invention is to provide an apparatus for manufacturing brushes from continuous bristle stock, and bristle plate or head stock, and inserting and setting predetermined lengths of such stock in the plate or head stock.

Another object of the invention is to provide an efficient and economical apparatus for manufacturing a brush and equipping it with a small quantity of housed tooth paste.

Another object of the invention is to provide a novel and efficient tooth brush element equipped with a small quantity of housed tooth paste.

Other objects of the invention will be apparent from the following description taken in conjunction with the drawings.

For a better understanding of the invention, reference may be had to the accompanying drawings forming a part of the specification, wherein:

Fig. 5 is a plan view illustrating on a larger scale, an apparatus shown by Fig. 1, for treating thread with plastic and forming bristle stock therefrom;

Fig. 6 is a side elevational view of the construction shown by Fig. 5, partly in cross section for the purpose of bringing out certain details more clearly;

Fig. 7 is a longitudinal and central cross-sectional view, on a larger scale, of the construction shown by Fig. 4, with the platens separated;

Fig. 8 is a view similar to Fig. 7, but with the platens closed;

Fig. 9 is a cross-sectional view taken substantially along line 9—9 of Fig. 8;

Fig. 10 is a cross-sectional view taken substantially along line 10—10 of Fig. 8;

Fig. 11 is a cross-sectional view similar to Fig. 7, but illustrating a machine constructed according to a different form of the invention;

Fig. 12 is a cross-sectional view taken substantially along line 12—12 of Fig. 11, but showing the platens in closed relation;

Figs. 13 and 14 are fragmentary sectional views illustrating operation of the bristle feeding device shown by Fig. 11;

Figs. 15 to 22 inclusive, are cross-sectional views of apparatus that may be employed for applying a tooth paste housing means to the back face of each brush manufactured;

Fig. 23 is a fragmentary cross-sectional view illustrating an apparatus for setting bristles in plate stock according to another form of the invention, and particularly where the stock is of heavier gauge.

Figures 2, 3:
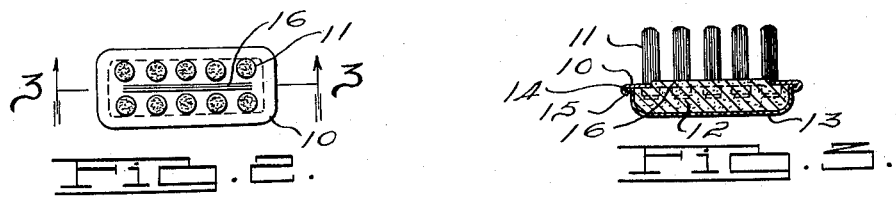
Fig. 2 is a bottom plan view of one form of tooth brush that may be manufactured according to the invention.
Fig. 3 is a cross sectional view taken substantially along line 3—3 of Fig. 2.

According to one form of the invention, a tooth brush element may be manufactured such as that illustrated by Figs. 2 and 3, which is particularly adapted to be used in conjunction with a handle such as disclosed, for example, in the co-pending application for patent of Stanley V. Laub relating to Tooth brushes, Serial No. 604,400, filed April 11, 1932, which has matured into Patent Number 1,947,722. The element disclosed in Figs. 2 and 3 may comprise a plate 10 composed of suitably stiff material such as aluminum, fiber composition or the like, and this plate has a series of bristles 11 secured thereto and projecting from one face of the plate. At the opposite side of the plate, a small quantity of tooth paste, indicated at 12, is housed by a cover 13 and such cover may be composed of any suitable, flexible but sufficiently strong material, such as cellophane or aluminum foil, for example. The cover has a marginal, plane portion 14 which is engaged and held against the plate by a flanged-over portion 15 at the edge of the latter. It will, therefore, be appreciated that the cover, in conjunction with the plate, seals the paste and maintains it in good condition until used.

The paste is adapted to be extruded through a slot 16, for example, extending longitudinally and substantially centrally of the plate and it will be apparent that upon depressing the flexible cover 13, the paste will be extruded through this slot and into the region of the bristles 11. Preferably, this slot will be so sealed by some material soluble in water, such as certain forms of gelatine, that before using the brush, it is only necessary to hold it under water for a short period of time when the gelatine will sufficiently be dissolved that the paste may be extruded through the slot into the bristle area.

Figure 1:
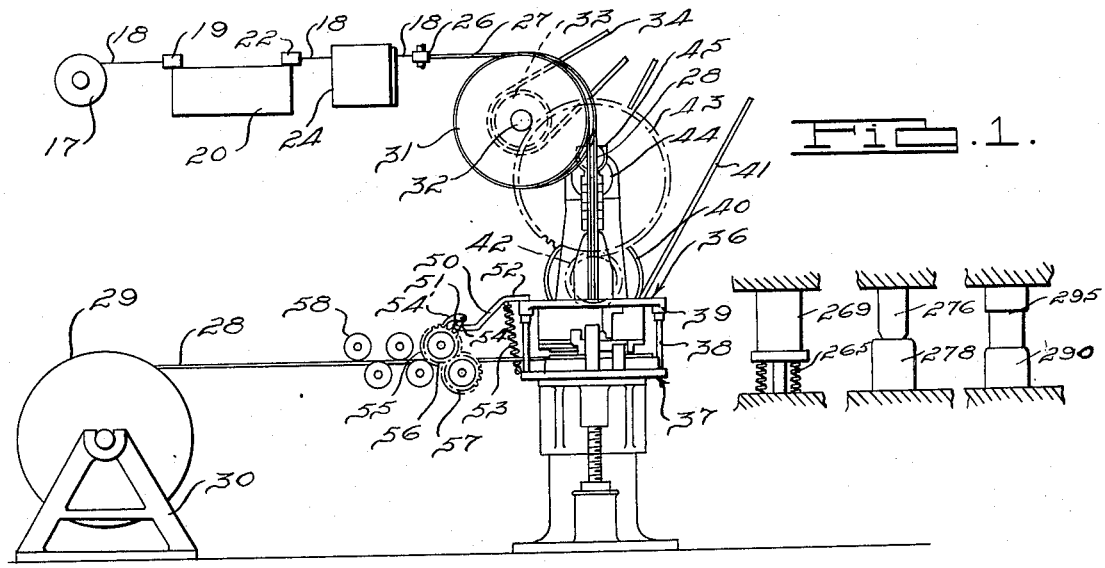
Fig. 1 is a general view, to some extent diagrammatic, illustrating apparatus for manufacturing brushes according to one form of the invention.

In manufacturing a brush of this character it has been found decidedly advantageous to manufacture the bristles from a continuous bristle stock. According to one form of the invention this continuous bristle stock is obtained by treating cotton, rayon or other forms of thread with a suitable plastic and then allowing the plastic to dry. Rayon thread particularly has been found to be useful in manufacturing bristle stock in this manner. As an initial step in manufacturing the brush therefore, rayon thread from spools, for example, is subjected to the action of a plasticizing agent and thereafter allowed to dry. Rayon thread of about 300 denier in size has been found very satisfactory for tooth brush purposes. In treating this thread it may first be coated with a fairly thin solution of pyroxylin in which gun cotton of low viscosity is employed. So-called one-half second gun cotton, when dissolved in alcohol of 25% concentration and ether of 75% concentration, containing approximately 3% solution of gun cotton, seems quite satisfactory. Following the application of this coat of pyroxylin, a second coat may be applied and preferably this second coat is of more viscous nature for the purpose of giving a thicker coat to the thread than the first coat and thereby imparting greater stiffness as well as flexibility to the thread. For the second coat, pyroxylin of a higher concentration may be used, and in addition a suitable plasticizer such as camphor, tricresyl phosphate, etc., may be used. A suitable second coat also may be applied by using a 10% solution of celluloid in ethyl acetate wherein the celluloid or commercial pyroxylin contains 26% camphor. While either or both coats of pyroxylin may be applied, apparatus is illustrated for applying one coat, but it is to be understood that more than one coat may be employed as found most desirable. Referring to Figs. 1, 5 and 6, the thread is furnished in the form of spools, indicated at 17, the number of spools depending upon the number of bristles to be provided in each brush. The thread, indicated at 18, then may be directed from each spool through a glass tube 19, secured at one edge to a tank 20 containing the plastic solution. This tube extends beneath the surface of the plastic solution and terminates in a straight portion 21 for the purpose of more easily guiding the thread transversely through the solution. At the opposite side of the tank 20, a second and similar glass tube 22 may be employed for directing the thread out of the tank, and preferably the lower portion of this tube has a restricted opening 23 for removing excess plastic from the thread. The thread then may be directed through any suitable drying apparatus, indicated at 24, and preferably short glass tubes 25 will be provided at each side of the drying apparatus for allowing the thread to enter and pass out of the drying apparatus with minimum interference and friction. After leaving the drying apparatus, a series of threads is directed between grooved rollers 26 for the purpose of associating such number of threads into a single continuous bristle stock 27 composed of many threads.

In the brush illustrated in Figs. 2 and 3, ten bristle tufts 11 are provided, each of which is to be severed from a line of bristle stock 27. Therefore, in practice, 10 lines of bristle stock 27 will be manufactured. The apparatus illustrated by Figs. 5 and 6 is exemplary only of the manufacture of one line 27 of stock, and it is to be understood that 10 apparatus of this character may be used. Furthermore, a larger number of threads may be embodied in each stock line 27. Also, as stated previously, the thread may be passed through two plastic baths if desired, instead of the one shown.

The stock from which the plates 10 are manufactured also is in the form of an elongated strip continuous in character, indicated at 28 in Fig. 1, and this stock initially may be wound on a spool or reel 29 rotatably supported on a frame 30.

Each line 27 of bristle stock after it leaves its rollers 26 may be directed around a narrow drum 31 which may be mounted on a shaft 32 for rotation therewith and the shaft in turn may have a pulley 33 driven by an endless belt or chain 34 in turn driven by power operated means. Preferably, each line 27 of bristle stock is wrapped around its drum at least once before it is directed downwardly into the machine.

Generally speaking, the machine comprises a vertically reciprocatory upper platen 36 and a stationary platen 37, the latter being provided with guide posts 38 slidable through bosses 39 on the platen 36 so that the upper platen may be guided upwardly and downwardly during its reciprocatory movement. Such reciprocation of the upper platen is effected by means of a pulley 40 driven by a belt 41, for example, and such pulley 40 may have a pinion 42 associated therewith, which meshes with a larger pinion 43 mounted on a shaft 44. The shaft 44 may be connected to the platen 36 by means of an eccentric 45, and suitable connecting rod. It does not seem necessary to go specifically into detail to describe the reciprocating mechanism for moving the platen 36, as such mechanism may be conventional.

For drawing the plate stock 28 into the machine periodically and automatically, a lever 50 may be pivotally mounted on a stationary pin 51 and provided with a lip 52 extending over the upper surface of platen 36. This lever is normally urged downwardly against the platen surface by means of a spring 53. A link 54 also mounted on pin 51 and rigidly related to lever 50, to rotate about the axis of the pin with such lever, is provided at its outer end with a pivotally mounted pawl 54' This pawl is adapted to engage ratchet teeth 55 on a wheel 56 and the latter in turn has teeth engaging a sprocket wheel 57. The wheel 56 and sprocket wheel 57 have cylindrical surfaces which may be knurled if desired, and the plate stock 28 is adapted to pass between them and be drawn into the machine thereby. Other idling rollers 58 may be provided for straightening the stock 28 before it passes between the wheels 56 and 57.

It will be generally understood that upon movement of the platen 36 upwardly the lever 50 is moved upwardly and hence the pawl 54 will cause partial rotation of wheel 56 in a counter-clockwise direction, and this will cause a predetermined feed of the stock 28 into the machine. Upon downward movement of the platen 36 the spring 53 will draw the lever 40 downwardly but during this movement, the pawl 54' only idles over the teeth 55.

Now referring to Figs. 7, 8 and 9, the bristle stock 27 is directed from drums 31 downwardly through an enlarged opening 60 in the upper platen 36. The plate stock 28 is directed over a pad 61 mounted on the lower platen 37 but which is normally maintained a slight distance above the platen when the upper platen is moved upwardly, by means of springs 62, at each end of the pad. On the upper face of the pad 61 and extending longitudinally thereof at each side, guide plates 63 are rigidly mounted on the pad and, as best shown by Fig. 9, the inner edge of each plate is cut away as indicated at 64 to receive a side edge of the stock strip 28. It will be noted that the vertical distance between the upper face of the pad 61 and the cut-away portion or shoulder 64 is greater than the thickness of the stock 28 which allows some vertical movement of the stock which is desirable as will hereinafter be described. The central part of the pad 61 and for a substantial distance longitudinally thereof is open as indicated at 65 to receive certain parts of the apparatus used.

The bristle stock 27 after it passes through the opening 60 in the upper platen 36, passes between jaws 66 and 67, separated by a plate 68 and the adjacent faces of the jaws and the opposite faces of the plate have grooves for receiving the respective stocks of bristles. Springs 68' and 69 disposed in openings in the jaws respectively, and abutting opposite sides respectively of an open portion 70 formed in a block 71 on the lower side of the platen 36, normally urge the jaws toward the plate 68 for clamping the bristle stock accordingly. It will be noted that the block 71 is mounted on guides 72 and 73 secured to the underside of the platen, as best shown by Fig. 9, so that the block may be slidably moved lengthwise of the platen. The block 71 as seen in Figs. 7 and 8, is normally urged toward the right by means of a spring 74, disposed in an opening, provided in a leg 75 rigidly secured on the lower side of the platen.

Figure 4:
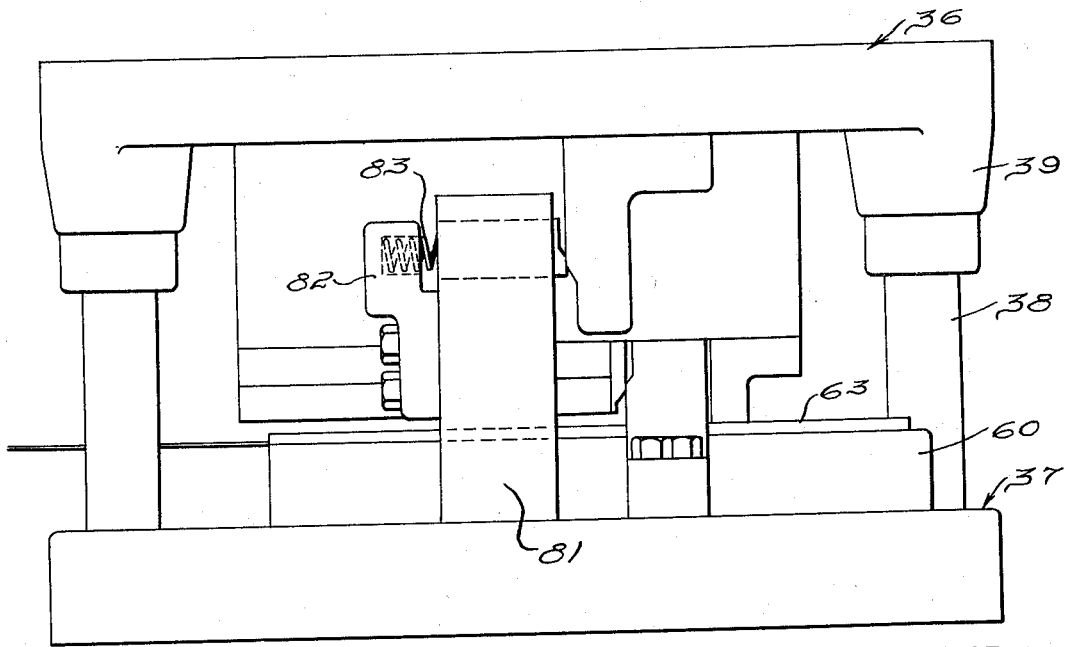
Fig. 4 is a fragmentary front elevational view of the machine shown in Fig. 1, illustrating stationary and movable platens when in their closed positions.

Following passage of the stock 27 through the jaws 66 and 67, the stock passes through openings 76 in the block 71, then through an open space, and then through a jaw device 77 which as shown by Fig. 9, has its end portions mounted in uprights 80 and 81 secured to the lower platen 37. As best shown by Figs. 4 and 9, each of the uprights 80 and 81 has an offset arm 82 having an opening for receiving a spring 83 and these springs abut, at their other ends, with the ends of the jaw device 77. Accordingly, two springs are provided, one at each end of the jaw device for urging it in the same direction that the spring 74 urges the block 71. The device 77 of course is slidably mounted in the uprights 80 and 81 to slide parallel to the block 71. It now will be apparent that the block 71 with the jaws 66 and 67 are slidable relative to the upper platen 36 although mounted thereon for vertical reciprocatory movement therewith whereas the jaw device 77 is stationary with respect to any vertical movement, although it may move parallel to the block 71.

As best shown by Figs. 7 and 8, cam members 85 and 86 project downwardly from the block 71 at opposite sides of the jaw device 77, and are secured to the block in a rigid manner. The lower face of the cam member 85 has a shear member 87 rigidly secured thereto, and projecting under the device 77, and such member has openings 88 aligned with the openings through the jaw device and openings between the jaws 66 and 67, for receiving the bristle stock. These openings are of substantially the same dimensions as that of the bristle stock although they will readily permit the stock to pass therethrough. The outer face of the cam member 85 has a cam surface 89 adapted to cooperate with a complementary cam surface 90 formed on one face of a cam member 91 secured rigidly to the lower platen 37 at opposite sides of the pad 61, but which has an opening 92 for permitting the plate stock 28 and bristles subsequently associated therewith, to pass through the machine. The member 91 also has a second cam surface 93 adapted to cooperate with the cam surface 94 on the shear member 87, the two pairs of cam surfaces operating similarly and providing a more accurate action.

From this description it will be apparent that when the upper platen is in its raised position as shown by Fig. 7, the block 71, the jaws 66 and 67, the cam members 85 and 86, the jaw device 77 therebetween, and the shear member 87 will be at the right and in limited positions, governed by abutment with member 91. When the platen 36 is moved downwardly, engagement of cam surfaces 89 and 93 with cam surfaces 90 and 94 respectively, causes a movement of the block 71, cam members 85 and 86, member 87, and the jaws in both jaw devices, to the left although it will be apparent that the jaw device 77 will not move downwardly but will only move to the left in the guideways provided in uprights 80 and 81.

Referring now to Fig. 9, the jaw device 77 comprises a block 96 having a cover plate 97 and such block and cover plate are slidably mounted as mentioned previously, in the uprights 80 and 81. Centrally thereof, the cover plate 97 is provided with a series of openings 98 for receiving the lines of bristle stock 27 respectively and below the opening a recess 99 is provided in block 96 and the bottom wall of this recess is apertured as indicated at 100 for receiving the lines of bristle stock following its passage through the recess. The jaw devices for gripping the bristle stock are mounted in this recess.

Referring now to Figs. 7, 8 and 9, between the two lines of bristle stock as shown in Fig. 7 and in the recess 99, a clamping plate 102 is provided and this plate in its opposite faces, is provided with grooves 103 substantially complementary to the several lines of bristle stock, so that each stock of bristle may move along in one of the grooves. At opposite sides of the two lines of bristle stock as shown in Figs. 7 and 8, jaw elements 104 and 105 are provided which are rigidly associated respectively with heads 106 and 107 slidably mounted between the bottom wall of the recess 99 and the cover plate 97. These blocks are slidable toward and away from the bristle stock and hence when they are brought toward each other and toward the bristle stock the jaws 104 and 105 in conjunction with the plate 102, will tightly grip the bristle stock therebetween. In the heads 106 and 107, dogs 108 and 109 are provided which are pivoted respectively on pins 110 and 111 journalled in openings in the heads. A lip 112 on each dog engages a spring 113 and the opposite ends of the springs abut the jaw elements 104 and 105, so that the dogs normally turn upwardly. Each dog also has a cam portion 115 adapted to engage the inner face of the cam member 85 or 86 adjacent thereto, and the inner faces of these cam members are provided with cam portions 116 and 117 for engaging such cam portions of the dogs.

As seen in Fig. 7, it is apparent when the upper platen moves downwardly the dogs will merely pivot about the pins 110 and 111 as cam portions 116 and 117 move past the dogs and will not cause the jaws to be forced toward the plate 102 with any great degree of force. To offset any tendency of the jaws to move together when the dogs so pivot and to maintain the jaws separated from the bristle stock during downward movement of the platen, a spring 118 may be provided in a slot at each side of the cover plate and a projection 119 on the head adjacent thereto may abut the outer end of this spring and if the jaws are moved toward the bristle stock these springs will be compressed. In other words the springs 119 normally tend to maintain the jaws separated from the bristle stock and are of such character that normally during downward movement of the platen the dogs will merely rock about their pivots without moving the jaws toward the bristle stock.

As shown by Fig. 10, heads 106 and 107 are provided for each pair of bristle stock lines and these are indicated generally at 120, 121, 122, 123 and 124. In other words, viewing Fig. 7, there are a series of the heads and associated jaws 104 and 105, each pair of which is adapted to engage two of the transversely aligned bristle stock lines. When the upper platen moves downwardly as has been stated, the dogs merely pivot around their pivot pins as the cam surfaces 116 and 117 engage the dogs, but when such cam portions are below the dogs, an upward movement of the platen causes the dogs to firmly abut the upper walls of the heads and for the cams to move past the dogs under such conditions, the dogs and hence the blocks must move inwardly toward the bristle stock and this results in a clamping engagement of the jaws with the bristle stock. It may be stated in this connection that the clamping engagement of the jaws is greater than that exercised by the springs 68' and 69 on the upper jaws 66 and 67 and accordingly, during upward movement of the upper platen when the lower jaws engage the bristle stock, they will hold it against further upward movement and the upper pair of jaws will merely slide along the bristle stock. At other times however, when the cams 116 and 117 are not holding the lower jaws in binding engagement with the bristle stock, the upper pair of jaws is sufficiently strong to move the stock. For causing a varied operation of the lower series of jaws, the lower edges of the cam surfaces 116 and 117 are stepped differently as indicated at 125, 126, 127, 128 and 129 but the upper edge of each cam surface being straight as indicated at 130.

On the lower face of leg 75 as seen in Fig. 7, a plate 135 is fastened, and to the lower side of this plate, a second plate 136 is secured. A pad 137 is mounted on plate 136 by means of a bolt 138 and it will be seen that this pad may have limited movement in a vertical direction with respect to plate 136 and that it is normally urged downwardly by means of a spring 139. The right end of plate 136 terminates in a guide portion 140 slidably receiving the shear member 87 and it will be understood that during lateral sliding movement of the latter, it moves in the guide portion. The bottom wall of the guide portion of the plate constitutes a shear member 141 and such member has openings 142 for receiving the lines of bristle stock. Accordingly, as shear member 87 is moved to the left, it cooperates with member 141 and shears the bristle stock along the contacting surfaces of such members. The pad 137 has a portion 143 extending under the shear member 141 and spaced therefrom when the pad is in its lower position and such portion 143 has openings 144 likewise for receiving the lines of bristle stock.

A pair of pins 145 and 146 secured to plate 136 and projecting slidably through openings in pad 137, terminate in conical ends 147 which are adapted to cooperate with openings 148 in a block 149 secured to the lower platen in the recess 65 in the pad 61 on such lower platen. Between the pins 145 and 146, the pad 137 has an elongated, substantially V-shaped groove 150 adapted to cooperate with a V-shaped rib 151 of similar length, disposed between the openings 148 in the block 149 on the lower platen. To the right of the V-shaped groove 150 in the pad 137, the pad portion 143 is provided with similar and spaced grooves 152 and 153, the latter being disposed between the openings 144 for receiving the bristle stock. When the upper platen is moved downwardly, the pad 137 engages the plate stock 28 and the pins 146 and 145 will punch openings indicated at 145 and 155 in such plate stock and between such openings the V-shaped rib 151 cooperating with the groove 150 in the pad to form the slit or elongated opening 16 between the two lines of openings formed in the plate.

It is now desired to generally describe the operation of the machine. It may be assumed initially that the upper platen has been reciprocated twice to form at least two series of openings 154 and 155 and the slit 16 between in sectors of the plate stock 28, the latter having been fed during the upward movement of the platen the requisite amount. Then the advanced apertured sector of plate stock is disposed directly below the openings 144 in the pad 137. The succeeding sector and pair of openings 154 and 155 therein are then disposed above apertures 157 in block 149 so that upon the next movement of the platen downwardly, such openings will receive the depressed parts of the plate around the openings and prevent crimping thereof. Directly below the pair of openings 154 and 155 in the advanced sector and in alignment with the openings 144 in pad 137, openings 160 and 161 are provided in the block 149 and these openings are adapted to crimp the flange metal around the openings 154 and 155 in the sector and around the bristle stock after such stock is inserted in such openings. Pins 162 and 163 slidably mounted in the openings 160 and 161 and a plate 164 normally pressed upward by means of a spring 165 seated in the lower platen, are adapted to free the plate stock from the block 149 following the crimping operation.

When the upper platen moves downwardly, the jaws 66 and 67 engaging the bristle stock will carry it along with them and through the lower set of jaws which are released during downward movement of the upper platen, and as the pad 137 approaches the lower platen and particularly the pad 61, the ends of the bristle stock in the openings 144 in pad 137 may be brought into juxtaposition with the openings 154 and 155 in the advanced sector of plate stock aligned therewith. When pad 137 finally engages the pad 61 the pad first mentioned will be moved against the action of spring 139 and this will occur prior to movement of the pad 61 against the lower platen. Also as the upper platen moves downwardly the pins 146 and 144 will be brought into a position to punch holes through the third plate stock sector and to form the slit between them although this will not occur until the pad 61 is moved downwardly. As pad 137 is moved against the action of the spring 139, the portion 143 thereof will travel upwardly relative to the bristle stock and cause the lower ends of the latter to project below the pad and hence will provide projecting portions adapted to project into the openings 154 and 155 in the plate stock sector disposed therebeneath. In other words, when the upper platen is moved downwardly enough that pad 137 engages pad 61 and then causes pad 137 to move upwardly against plate 136, the lower portions of the bristles will project beneath the pad 137 and enter the flanged openings 154 and 155 in the plate stock. Further movement of the upper plate downwardly with the pad 137 and plate 136 will cause the pad 61 to move against the lower platen and this will cause the flange portions of the plate stock defining openings 154 and 155 to project into the openings 160 and 161 in block 149, and the flanged metal around such openings in the stock to be crimped into engagement with the bristle stock therein. It may be stated that such openings around the pins 160 and 161 are of such character that they will cause a contraction of the flanged metal around the openings in the plate stock and normally in fact such flanged metal will be slightly tapered during formation so that passage of the flanged portions into the openings around the pins 162 and 163 will cause setting of the bristles in the plate.

It is apparent therefore that during this movement of the platen that a pair of openings 154 and 155 and the slit between them are formed in the third sector of plate stock and that the bristle stock is fastened in the openings 154 and 155 in the advanced plate stock sector. The metal pressed upwardly slightly during the formation of the slit 156 is adapted to fit into the grooves 152 and 153 in the lower surface of pad 137 during operation of the machine or in other words the slits in the two advanced sectors of plate stock will fit into these grooves during downward movement of the pad 137 so that no interference will occur. At the right of block 149, a second spring pressed pad 175 is provided for supporting that part of the plate stock to which the bristles have been secured, to permit a downward movement thereof, substantially the same as that permitted by pad 61.

During setting of the bristles the pins 162 and 163 will move downwardly against the action of spring 163 and then during movement of the upper platen upwardly, the spring pressed pins will act to move the plate stock upwardly and free it from block 149. The springs 62 causing the pad 61 to move upwardly also will tend to move the plate stock upwardly and prevent any binding thereof with lower parts of the apparatus. The guide 63 on the pad 61 of course prevents the upper platen from carrying the plate stock upwardly during initial upward movement and accordingly the severed bristles now fastened in the plate stock will be removed from pad 137 and shear member 141.

During the final downward movement of the upper platen, the cams 89 and 93 ride over the cam surfaces 90 and 94 and cause a lateral movement of the entire bristle supporting apparatus below the upper platen, to the left, with the exception of those portions of the bristle stock in the shear member 141 and in the pad 137. Consequently, the shear member 87 will sever the bristle stock at the level of the upper surface of shear member 141. Movement of the entire part of the bristle stock above the lower shear element to the left is desirable as bending of the bristle stock is not then obtained and no damage will result from this operation. The enlarged opening 60 in the upper platen permits this movement of the bristle stock without bending around any corners or the like.

As the upper platen moves upwardly the cams 89 and 93 ride off of the cams 90 and 94 and consequently the jaw devices and the shear member 87 again return to their right limited position and when so positioned the openings in the shear member 87 are again aligned with the openings in the lower shear member 141. As the upper platen continues to move upwardly, the cam surfaces 116 and 117 engage the dogs in the lower jaw device, cause the jaws therein to clamp the bristle stock and hence maintain it stationary and further movement of the platen upwardly merely causes the upper jaws to slide along the bristle stock. It is to be noted at this time that the shear members 87 and 141 as best shown by Fig. 9, have stepped portions 180, 181, 182, 183 and 184 and consequently that the bristle stock as severed has staggered ends. This is often desirable in a finished tooth brush in that it leaves the brush of an irregular formation which is advantageous in teeth cleansing operations. This staggering of the shear surfaces, however, directly cooperates with the positioning of the cam surface 125, 126, 127, 128 and 129 in the following manner. As the upper platen continues to move upwardly, cam surface 129 will first engage the left dogs as seen in Fig. 10, and clamp them tightly and since the lower end of the bristle stock between such jaws is at a higher point, more bristle stock will have to be fed in this line of bristle stock since this constitutes the bristle stock giving to the finished brush the greatest length of bristles. In other words as the upper platen moves upwardly, referring to Fig. 9, the two sets of bristle stock at the left will be gripped first and held and then upon a little farther movement of the upper platen, the next pair of lines of bristle stock will be gripped and held and the remaining three lines in a similar sequential order. What really happens as a result of this operation is that the second pair of bristle stock lines will be pulled upwardly by the upper pair of jaws 66 and 67 until its lower ends are aligned with the lower ends of the first pair of bristle stock, then the third pair of bristle stock lines will be pulled upwardly a greater distance by the upper pair of jaws etc., until finally when the jaw device 77 grips all lines of bristle stock, the lower ends of the bristles again will be in alignment. Then all of the jaw elements 120 to 124 inclusive will grip the stock until the upper edges 130 of the cam surfaces 116 and 117 ride past the dogs 108 and 109. Then the jaw device 77 will release from the bristle stock and the upper jaws will come into action and pull the bristle stock upwardly until the upper platen reaches its upper limiting position. It should be stated in this connection that during the upward movement of the platen, the jaw device 77 gripping the bristle stock after the ends of the latter are aligned, holds it for a sufficient length of time that the bristle stock is fed down through the pad 137 into the positions shown in Fig. 7.

During such upward movement of the upper platen, the ratchet and pawl device shown in Fig. 1 is operated to advance the plate stock to the right until the newly formed openings 154 and 155 in the plate are disposed over the openings 157, and the openings that were positioned during the preceding operation over openings 157, are located over the openings around pins 162 and 163. Then upon a return movement of the upper platen downwardly, the operation of cutting the bristles and punching one series of openings in the plate stock will be repeated.

When the plate stock with the bristles fastened thereto in longitudinally spaced relation, reaches the right end of the machine as shown by Fig. 7, the first bristle element or sector will be disposed over a die opening 190 in a block 191 fastened on the lower platen in the opening 65 in pad 61, and upon downward movement of the upper platen, a shear blade 195 will sever the bristle element from the remainder of the plate stock and this shear device is such that the plates as shown by Figs. 2 and 3 will have rounded corners. The severed bristle element will then fall through an opening 196 in the lower platen which may serve as a hopper for receiving the bristle elements.

During operation of the machine described the drums about which the lines of bristle stocks are wound are rotated at such rate of speed that enough surplus bristle stock will be at the advance side of the drum to accommodate the amount of bristle stock that is removed during manufacture of the brush. This movement of the drums might be periodic or it may be continuous but during each reciprocation of the upper platen, the amount of bristle stock severed is provided at the advance side of the drum. In manufacture of a brush in which the bristles have different lengths as described, it is more desirable that the drums about which the bristle stock is wound vary in diameter so that a greater surplus of stock will be provided as needed, and the proper amount of stock advanced to take care of the bristle stock feed required in manufacturing the bristles of different lengths.

Referring now to Figs. 11, 12, 13 and 14, a modified form of machine for manufacturing brushes is illustrated and in this construction the bristles in each brush are of substantially the same length. In this machine the upper platen 36 is provided with jaw elements 66 and 67 like those illustrated and described previously, but in this case no lateral movement is obtained and the jaws are mounted in a housing 200 secured by bolts to the lower face of the platen. Cam members 201 and 202 also secured to the lower face of the platen 36 extend downwardly on either side of the housing 200 and are provided on their adjacent surfaces with cam faces 203 and 204.

A jaw device 205 similar to the jaw device 77 previously described, is mounted between the cam members 201 and 202 but is rigidly fastened as shown by Fig. 12 to uprights 206 and 207 rigidly supported on the lower platen 37, bolts 208 being employed for securing the jaw device to such uprights. Similarly to jaw device 77, jaw device 205 comprises a block 209, a cover plate 210 and the block has a recess 211 defined by a bottom wall 212 for receiving the jaw elements and dogs.

Now referring to either of Figs. 13, 14 and 11, the jaw elements comprise heads 213 and 214 at opposite sides of the lines of bristle stock passing through the device and such heads extend substantially throughout the length of the recess 211. At opposite ends the heads are urged apart by coil springs 215 and 216 disposed between them. The heads include jaw elements 217 and 218 which may be fixedly associated therewith and each jaw element has a series of vertically disposed grooves adapted to cooperate with the lines of bristle stock extending through the jaw device at the same side of the device. Between the lines of bristle stock, a plate 219 is located and such plate has grooves in its opposite faces for cooperating with both lines of stock. Instead of using a plurality of dogs in each head as described previously, a single dog 220 may be employed in each head, each dog being adapted to cooperate with one of the cam faces 203 and 204 on the cam members 201, 202. At the left side of cam member 202, a block 222 is secured to the lower face of the upper platen 36, and such block supports a plate 223 extending beneath the cam members 201 and 202 and below the jaw device 205 and such plate also is provided with openings 224 for receiving the two lines of bristle stock. Below this plate, another plate 225 is secured thereto, and such plate supports a pad 226 which may have limited vertical movement with respect to plate 225 and which is normally urged downwardly to its lower limited position by means of a spring 227. The plate 225 supports the series of pins 228, 229, 230, 231 and 232 adapted progressively to form two aligned series of openings in the bristle plate stock 28 directed through the machine. These pins pass through appropriate openings in the pad 226. The lower face of the pad between the pair of pins 232 also is provided with a V-shaped groove 233 which, as mentioned previously, is adapted to cooperate with a lower member for slitting the bristle plate stock between such openings. Such pad also has other grooves 234 and 235, the last of which is disposed between the two lines of bristle stock and such grooves are adapted to cooperate with the upwardly pressed slitted portion of the plate stock during the periodic movement of the latter through the machine.

The plate 225 also includes a shear member 236 which cooperates with an upper shear member 237 which is slidably mounted between the shear member 236 and the plate 223. Normally the shear member 237 is urged toward the right by means of a spring 240 but it is provided with a cam face 241 adapted to cooperate with a cam face 242 on a stationary member 243 supported by the lower platen. Accordingly, during downward movement of the upper platen, the shear member 237 is moved to the left when the cam face 241 rides over the cam face 242, and this movement causes severing of the bristle stock along the upper face of the lower shear member 236. It will be noted that the shear member 237 has an opening 243 and this is provided to permit bending of the bristle stock below the plate 225 and therefore to prevent shearing of the bristle stock along the lower face of such plate.

The lower platen is provided with the pad 6 pressed upwardly by means of the springs 62 and is centrally apertured throughout its length for accommodating other parts of the apparatus. In this recess, a die element 245 is provided near the left end of the pad and such element has openings aligned with the respective pins on the plate 225. In alignment with the groove 233 a projection 246 is provided which is adapted to slit the plate stock as described previously to provide an opening therethrough.

When the upper platen is moved downwardly, the pair of pins 228 cooperating with the openings below the plate stock and in alignment with the pins, are adapted to form the depressions 247 in the plate stock. Then during an upward movement of the platen, the plate stock is advanced, and the depressions 247 then are in alignment with the pins 229 and during the next downward movement of the upper platen, the depressions 247 are changed in contour as indicated at 248. During the next upward movement of the upper platen, the depressions 248 are moved into alignment with the pins 230 and during the next downward movement of the platen the depressions 248 are changed as indicated at 249. During the next movement of the platen upwardly, the depressions 249 are moved into alignment with the pins 231 and then during downward movement of the platen, the depressions are shaped as indicated at 250. Following this, and a movement of the platen and plate stock accordingly, the depressions 250 are brought into alignment with the pins 232 and when these pins move downwardly with the upper platen, the openings 251 are provided and, as stated previously, it is during this step that the slit is formed in the plate stock between the openings and such slit is indicated at 252. After the plate portions having the openings 251 and 252 move beyond the pins 232 they have an idle position, and then during the next operation they are brought into alignment with the bristle stock. Then during the next downward movement of the platen, the ends of the bristle stock are brought through the openings 251 and the flanged metal around the openings is crimped to hold the ends of the bristle stock in place. During this downward movement of the upper platen, the stock is severed by movement of the shear blade 237 laterally, and then during the next movement upwardly of the platen, the plate stock moves again, bringing the next pair of openings 251 into alignment with the bristle stock and carrying the plate stock with the bristles beyond the lines of bristle stock.

During this upward movement of the upper platen, the dogs 220 are engaged by the cam faces 203 and 204 and, since such dogs cannot pivot upwardly beyond the upper face of the heads in which they are located, the clamping movement of the jaws occurs during the time the dogs are in engagement with the cam faces and the bristle stock is held stationary. During this stationary period, the upper platen continues to move upwardly and after the cam faces pass the dogs, the jaws release the bristle stock and then the bristle stock is carried upwardly with the remainder of the movement of the platen by means of the jaws 66 and 67. During the upward movement of the platen, and while the jaw device 77 is functioning, the stock is moved downwardly through the lower shear element 236 and through the openings in the pad 226 where it is again in position to be inserted into the next pair of openings in the plate stock 28. Then during the downward movement of the upper platen, the jaws 66 and 67 carry the bristle stock downwardly as previously described.

A pad 255 is provided at the right of the bristle fastening means to permit a movement of the advanced plate stock with the bristles thereon, downwardly in accordance with that movement necessary during the bristle fastening operations. In this machine it is preferred to have the upper face of the shear member 236 and the lower face of the shear member 237 arcuated at the points of shear as indicated at 256 to give to the severed ends of the bristles a rounded appearance.

As the plate stock 28 continues to move to the right periodically with the bristles at spaced intervals, the end of the stock is brought over a lower die element 258 and then during subsequent downward movement of the upper platen an upper die element 259 is brought down and cooperates with the lower die element to sever an end portion of the plate stock having two lines of bristles thereon. In this manner individual brush elements are provided. These individual brush elements are adapted to pass through to the lower die and then through an opening through the lower platen.

While only one slit in the plate has been shown and described, it may be preferable to provide two separated aligned slit portions and to provide suitable slit forming dies to form slits of this character. An advantage of interrupting the slit at its center, and providing slit portions, is that the plate metal at its center is not disturbed and the latter will have greater rigidity.

Figure 15:
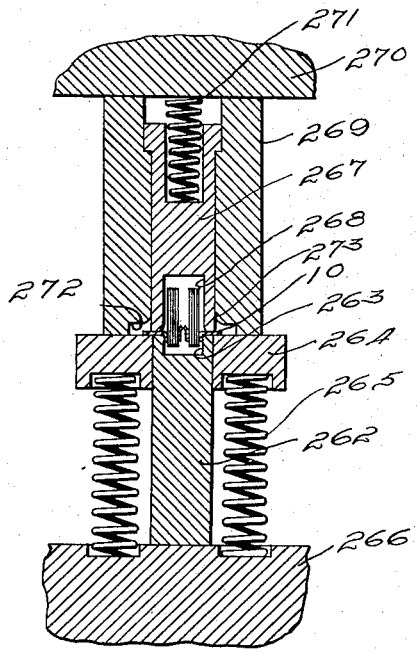
Figure 16:
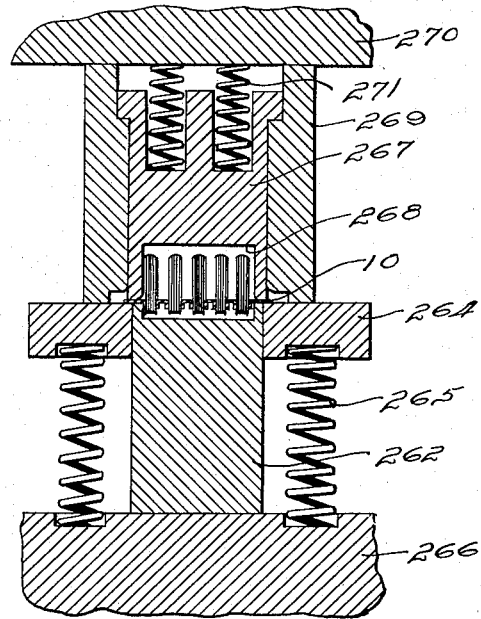
Figure 17:
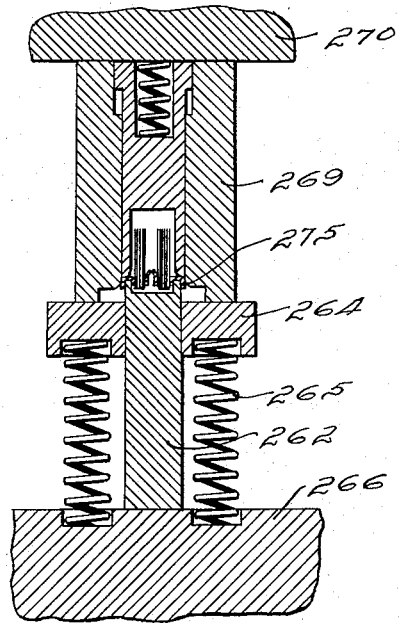
Figure 18:
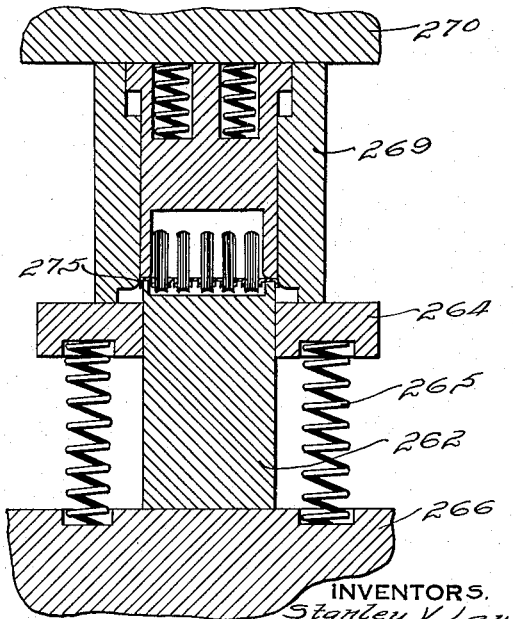

In regard to mounting a cover containing tooth paste on the back face of each of the individual brushes, reference now will be had to Figures 15 to 22 inclusive. Figs. 15 and 16 illustrate a lower die element and support 262 for the brush elements and it will be noted that the plate 10 of the latter has its margin projecting slightly beyond the outer margin of the die element, and that such die element has an opening 263 for receiving the central part of the brush having the bristles secured thereto. Around the lower die element, a rectangular pad 264 is provided having a central opening slidably receiving such die element and the pad is mounted on springs 265 supported on a lower stationary member 266. Above the die element 262, a block 267 is provided having a central opening 268 for receiving the upwardly projecting bristles on the brush, and around this opening the block seats on the plate 10. It will be noted that the dimensions of the block are such that its marginal edge projects slightly over the marginal edge of the lower die element. An upper die element 269 is mounted on a reciprocatory platen 270 and this platen also supports a spring 271 which resiliently urges the block 267 downwardly into contact with the margin of the plate 10. Around the lower die element, the upper die element 269 engages the pad 264 and adjacent the margin of the plate 10, it is provided with an opening 272 for initially accommodating the edge of the plate.

The upper platen 270 with its attached parts of course is movable away from the lower die element to permit positioning of the brush as shown in the figure. Then upon downward movement of the upper platen, the die element 269 moves the pad 264 downwardly, while the die element 262 remains stationary, and during this operation the marginal edge of the plate 10 is flanged as indicated at 275. After this operation the upper platen is moved upwardly sufficiently to permit removal of the brush.

Referring now to Figs. 19 and 20, an upper die element 276 is provided which is supported on a platen 277 and a lower die element 278 is sup- 2,035,709 ported on a lower platen 279. The upper die element 276 has a recess 280 for receiving the bristle portion of the brush, and tapered sides 281 adapted to cooperate with tapered sides 282 in the lower die element 278. The brush as removed from the die construction shown by Figs. 15 to 18 inclusive is laid in the recess defined by the tapered sides 282 in the lower die element 278 and with flange 275 on the plate 10 disposed substantially vertical and resting on the tapered wall 282. Prior to disposing the brush in such recess, however, a cover composed of cellophane, aluminum foil or the like and containing a toothpaste is disposed in inverted position as indicated at 283 with the cover projecting downwardly through a central opening 284 in the lower die, and in supporting relation to a central pad 285 normally urged upwardly by means of a spring 286. During downward movement of the upper platen, it being understood that the tapered surfaces 281 are initially disposed in vertically spaced relation with the tapered surface 282 on the lower die element, and the brush plate is first inserted, enough movement of the upper platen downwardly is permitted before the tapered surfaces engage, that the marginal flange 275 on the plate is deflected inwardly as indicated at 287. The cover 283 it should be noted, initially has a marginal flange 288 which seats against the plate 10 between the flange 275 and the series of bristle elements and when the flange on the plate is deflected as indicated at 287, initial overlapping engagement of the plate flange with the margin 288 of the cover is secured.

Then the brush with the cover mounted thereon is disposed in a lower die 290 shown in Fig. 21, having a spring pressed head 291 for receiving the cover portion. An upper die element 292 is provided on an upper reciprocating platen 293 and a spring preferably indicated at 294 is provided between the platen and such die. This die is adapted to still further bend over the flange 287 so that it will positively overlap the marginal edge 288 of the cover and firmly secure it on the plate. It will be apparent that following this operation, a brush construction shown by Figs. 2 and 3 will have been obtained. It will be noted also that the upper platen supports a movement limiting member 295 which surrounds the die member 292 and when this member engages the corresponding lower supporting member 290 the flange 287 will have been bent sufficiently for tightly clamping the cover on the brush plate.

Before or after the cover is mounted on the back of the brush element, a sealing material may be employed on one side of the plate to seal the slit therein. Gelatin may be used to seal this slit, and since it is soluble in water, the seal could then be dissolved merely by holding the brush under a stream of water. The gelatin may be applied in any suitable manner, and for example, it may be sprayed on the brush plate over the slit. It is feasible also to apply a thin coating of this material by spraying, for example, thereby providing a thin membrane covering for the slit, which could subsequently be ruptured upon depressing the cover. For providing a membrane of this character, by spraying for example, glyptals and lacquers also could be used.

Fig. 23 discloses a modified form of construction for crimping the plate stock to hold the bristles therein and this die construction preferably will be employed where the plate stock 28 is of greater thickness. Under these conditions, it is preferred to cut straight holes through the plate as by shearing operations, as punching the holes through and leaving a marginal flange of metal around the opening projecting from one side of the plate is more difficult to obtain and the metal perhaps is more undesirably strained. After cutting the openings in the plate for receiving the bristles, and inserting the bristle stock therein, a lower die element may be employed as indicated at 297, having a sharp upper edge 298 adapted to bite into the plate stock around the bristle openings and to force the metal inwardly into crimping engagement with the brush stock.

Where the plate stock is thicker as in the case just mentioned, it may be found more desirable to seal the marginal edge of the toothpaste cover to the face of the plate by a suitable adhesive or cement such as glyptals, or other types of resins, collodion, lacquers or the like. The character of this cement may depend on the plate stock and cover material used.

From the above description taken in conjunction with the drawings it will be apparent that novel methods and apparatus for manufacturing brushes and particularly tooth brushes have been provided and that such methods and apparatus provided and that such methods and apparatus so operate that the brushes may be produced rapidly and in large numbers at minimum expense.

It is also apparent that apparatus has been provided whereby the bristles may be formed of different lengths and contour. Particularly in the manufacture of tooth brush elements, the invention is extremely advantageous as it permits such manufacture thereof at a very small cost that the user may without extravagance, use one element for only one teeth cleansing operation and then discard it.

Although more than one form of the invention has been illustrated and described in detail, should be apparent that various modifications may be made without departing from the scope of the appended claims.

We claim:

1. The method of manufacturing brush which comprises directing continuous thread through a plastic, drying the plasticized thread forming an elongated bristle supporting element, directing the thread into a with openings, directing the thread into s fastening it in the openings, and cutting thread to predetermined length to form individual bristles.

2. The method of manufacturing toothbrush which comprises forming bristle supporting ments, forming a continuous bristle stock, cutting the stock and fastening individual lengths bristle stock on one face of the elements, securing tooth paste housing means on the other face of each element.

3. The method of manufacturing to brushes, which comprises forming a continuous bristle stock, forming an elongated bristle bristle stock, cutting the stock and fastening porting element, cutting the stock and fasten individual lengths of bristle stock on one fac the element, in longitudinally spaced rela cutting the element at longitudinally sp points to provide individual brushes, and sect tooth paste housing means on the other fa each brush.

4. The method of manufacturing tooth bri which comprises forming a bristle suppo element, treating continuous thread stock plastic, drying the plasticized thread, cuttin stock and fastening individual lengths o stock on one face of the element, and fast tooth paste housing means on the other face of the element.

5. The method of manufacturing tooth brushes which comprises forming an elongated bristle supporting element, forming a continuous bristle stock, forming openings in the element, cutting the stock and fastening individual lengths of the bristle stock in the openings, cutting the element into individual lengths, and mounting tooth paste receiving means on that face of each length, opposite the bristles.

6. The method of manufacturing tooth brushes which comprises forming a bristle supporting plate, fastening bristles on one face of the plate, mounting a tooth paste housing on the opposite face of the plate, and then flanging a marginal portion of the plate over a part of the housing means.

7. The method of manufacturing tooth brushes which comprises forming a bristle supporting plate, fastening bristles on one face of the plate, mounting a cup shape housing on the other face of the plate and then flanging a marginal portion of the plate over a marginal portion of the housing to hold and seal it on the plate.

8. In combination, means for conducting thread through a plastic, means for feeding the plasticized thread, means for fastening the ends of the thread in a substantially stiff bristle supporting element, and means for severing the threads to provide the element with bristles of suitable length.

9. In combination, means for feeding continuous bristle stock, means for fastening ends of the stock in a bristle supporting element, and means for severing the stock irregularly to provide a brush having bristles of irregular length.

10. In combination, means for feeding continuous bristle stock, means for fastening ends of the stock in a bristle supporting element, and means for severing end portions of the stock irregularly to provide bristles on the element which are of irregular length, said feeding means including means compensating for the different lengths of bristles severed.

11. In combination, means for setting bristles in a bristle supporting plate, and means for deforming a marginal portion of the plate to retain cleanser housing means thereon.

12. In combination, means for setting bristles in a plate, and means for flanging a marginal portion of the plate to retain cleanser housing means thereon.

13. In combination, means for applying plastic to continuous thread stock, means for feeding an elongated plate stock, means for cutting the thread stock and setting thread bristles in the plate stock, means for cutting the plate to form individual brushes, and means for fastening cleanser housing means on each brush element on that face thereof opposite the bristle face.

14. A machine for manufacturing brushes, comprising members movable together and apart, one member being adapted to support bristle supporting elements, means on the other member for directing common elongated bristle stock to the elements in sequential operations, means for cutting the stock between such operations, means on said other member for controlling the bristle stock advance during movement of the members apart, and means for varying the last means to provide bristles of irregular length for each element.

15. A machine for manufacturing brushes, comprising means for periodically feeding continuous lines of bristle stock, means for severing the end portion of the stock following a feeding operation, and means for varying the feeding operation to vary the length of stock severed.

16. A machine for manufacturing brushes, comprising means for periodically feeding continuous, separated lines of bristle stock, means for severing end portions from the several lines following a feeding operation, and means for varying the feeding operation so as to feed one line of stock at a greater rate than another, so as to vary the length of the end portions severed during a severing operation.

17. The method of manufacturing brushes, which comprises forming a bristle supporting element of deformable material with recesses for receiving bristle stock, directing continuous bristle thread stock through a plastic, drying the plasticized thread, and fastening predetermined lengths of the stock in the recesses by deforming the element around the recesses to clinch the stock therein.

18. The method of manufacturing brushes from elongated bristle stock, which comprises forming a bristle supporting element, conducting the bristle stock in parallel and separated bristle lines to the element, and fastening predetermined lengths of the individual lines to the element at spaced points in a sequentially operating order.

19. In combination, relatively reciprocating platens, means for periodically feeding bristle stock in elongated lengths through one platen, means for periodically moving bristle supporting elements between the platens, and means for fastening predetermined lengths of the bristle stock to the elements in a periodic sequential manner.

20. In combination, relative reciprocatory platens, means for periodically feeding bristle stock in elongated lengths through one platen, means for periodically feeding a deformable bristle supporting element between the platens, means for fastening predetermined lengths of the bristle stock in recesses in the element by deforming the material around the recesses, and means for severing the stock into such lengths.

21. In combination, means for periodically moving bristle supporting elements over a support, means for conducting elongated bristle stock in lines substantially perpendicular to the bristle supporting elements, reciprocatory means for periodically advancing the stock to the elements, means for fastening the end of the stock to an element upon its movement thereto, and means for severing an end portion of the stock to form bristles on the element.

22. In combination, means for periodically feeding an elongated, deformable, bristle supporting element, means for periodically advancing elongated bristle stock to the element, means for periodically severing the end of the stock into bristle lengths, and means for fastening the bristle length of the stock to the element by deforming the element to clinch the bristle.

23. In combination, means for periodically feeding an elongated, deformable, bristle supporting element, means for periodically advancing elongated bristle stock to the element, means for periodically severing the end of the stock into bristle lengths, and means for fastening the bristle length of the stock to the element by deforming the element to clinch the bristle between the element feeding and the bristle stocks advancing operations.

24. In combination, means for periodically moving deformable bristle supporting elements over a support, means for conducting elongated bristle thread stock through a plastic solution, means for drying the plastic, means for periodically feeding the coated bristle stock to the elements, means for fastening predetermined end lengths of the bristle stock in recesses in the elements by deforming the material, and means for severing the end bristle lengths from the stock, between the element and stock feeding operations.

25. In combination, means for periodically moving deformable bristle supporting elements over a support, means for periodically forming recesses in the elements, means for periodically conducting elongated bristle stock to the elements and inserting end lengths thereof into the recesses, means for deforming the material to fasten the bristle stock in such recesses, and means for periodically severing the stock into such bristle lengths.

26. In combination, means for supporting a bristle retaining element, means movable to and from the element for conducting and advancing elongated bristle stock to the element, during movement toward the element, and means for substantially holding the bristle stock during movement of the second means away from the element.

27. In combination, means movable in opposite directions for periodically conducting elongated bristle stock to a bristle supporting element during movement in one direction, means for severing the end of the stock after advance thereof, and means for predetermining the length of the bristle stock severed, during movement of the first means in the opposite direction.

28. In combination, means movable in opposite directions for periodically conducting elongated bristle stock to a bristle supporting element during movement in one direction, means for severing the end of the stock after advance thereof, and means for predetermining the length of the bristle stock severed, during movement of the first means in the opposite direction and controlled thereby.

29. In combination, means for setting bristles in a bristle supporting plate, and means for deforming a marginal portion of the plate to provide a flange along the edge of the plate.

30. In combination, means for setting bristles in a bristle supporting plate, and means for deforming a marginal portion of the plate to retain a cover on one side of the plate.

31. The method of manufacturing brushes which comprises forming continuous bristle stock, forming a bristle supporting element of deformable material, forming bristle receiving recesses in the element, fastening predetermined lengths of the bristle stock in such recesses by deforming the material around them to reduce the size of the recesses, and cutting the element into individual brushes.

32. The method of manufacturing brushes which comprises forming continuous bristle stock, forming a bristle supporting element of deformable material, forming bristle receiving recesses in the element, fastening predetermined lengths of the bristle stock in such recesses by deforming of the material around them to reduce the size of the recesses, and cutting the element into individual brushes, said recess forming and bristle fastening steps being effected periodically.

33. In combination, means movable in opposite directions for periodically conducting elongated bristle stock to a bristle supporting element during movement in one direction, means for supporting the element, means for variably severing the end of the stock after advance thereof so as to shape the brush, and means for fastening the stock to the bristle supporting element.

34. A machine for manufacturing brushes, comprising means for supporting elements adapted to have bristles secured thereto, means for supplying continuous bristle stock, means for gripping the stock and causing its movement periodically to the elements, means for periodically severing the end of the stock and fastening it to the elements, and means for guiding the stock and substantially preventing bending thereof between the gripping means and the element supporting means.

35. A machine for manufacturing brushes which comprises a support for elements adapted to have bristles secured thereto, means for supplying continuous bristle stock, means for gripping and causing periodic movement of the stock towards the support, means periodically movable transversely of the bristle stock adjacent the support for severing end portions of the stock, and means for maintaining the stock substantially free from bending between the gripping means and the support during the feeding and severing operations.

36. A machine for manufacturing brushes, which comprises a support for elements adapted to have bristles secured thereto, means for supplying continuous bristle stock, means for periodically gripping and moving the stock towards the support, means for periodically severing the ends of the stock, and means for substantially preventing bending of the end portions of the bristle stock during severance thereof.

37. A machine for manufacturing brushes which comprises means for supplying continuous bristle stock, means for gripping and moving the stock towards a support for bristle receiving elements, and means for periodically severing end portions of the stock including means for guiding it and shaping the severed end portions thereof to an irregular contour.

38. In combination, a means for feeding continuous bristle stock, means for feeding the bristle stock to increase its rigidity, and means for severing the stock irregularly to provide a brush having bristles of irregular lengths.

39. The method of manufacturing brushes which comprises the steps of forming bristle stock from material including a plastic, and then in an operation synchronized with the forming of the bristle stock and continuous thereto, fastening predetermined lengths of the stock to the bristle supporting elements.

40. The method of manufacturing brushes which comprises the steps of forming continuous bristle stock by using a material including a plastic which solidifies, solidifying the plastic, and then in an operation synchronized with the forming of the bristle stock and continuous thereto, fastening predetermined lengths of the stock to bristle-supporting elements.

41. The method of manufacturing brushes which comprises forming continuous bristle stock from material including a plastic which solidifies, solidifying the plastic, collecting lines of the stock into separated groups and then in a continuous operation fastening predetermined lengths of the separated groups to a bristle-supporting element.

42. A brush manufacturing apparatus comprising means for forming bristle stock from material including a plastic, means for feeding sustantially stiff bristle-supporting elements and disposing them in position for having lengths of the stock fastened thereto, and means for successively fastening predetermined lengths of the stock to the elements respectively.

43. A brush manufacturing apparatus comprising means for forming bristle stock from material including a plastic, means for feeding substantially stiff bristle-supporting elements and disposing them in position for having lengths of the stock fastened thereto, means for successively fastening predetermined lengths of the stock to the elements respectively and means rendering the last mentioned means and the first mentioned means operable in a continuous order so as to provide continuity in manufacturing the stock and securing successive lengths thereof to the bristle-supporting elements.

44. A brush manufacturing machine comprising a support for bristle-supporting elements, means movable towards and from the support for conducting elongated bristle stock thereto, gripping means for holding the stock substantially against movement when the movable means is moving away from the support, and means for moving the stock with said movable means when the latter is advancing towards the support.

45. A brush manufacturing machine comprising a support for bristle-supporting elements, means movable towards and from the support for conducting elongated bristle stock thereto, gripping means for holding the stock substantially against movement when the movable means is moving away from the support, and gripping means for moving the stock with said movable means when the latter is advancing towards the support.

46. A brush manufacturing machine comprising a support for bristle-supporting elements, means movable towards and from the support for conducting elongated bristle stock thereto, gripping means for holding the stock substantially against movement when the movable means is moving away from the support, and gripping means for moving the stock with said movable means when the latter is advancing towards the support, the last mentioned gripping means overcoming the first mentioned gripping means during such advance movement.

47. A brush manufacturing machine comprising a support for bristle-supporting elements, a pair of slidably fitting members relatively reciprocable along the support and having apertures aligned in one position of the members for conducting bristle stock to the support, means for advancing bristle stock through the apertures, means for fastening the end of the stock to the elements, and means for relatively reciprocating said members laterally of the bristle stock so as to sever an end portion thereof.

48. The method of manufacturing substantially stiff brush units, which comprises directing continuous thread elements through a stiffening solution, drying the treated threads, forming substantially stiff supporting elements, and then fastening predetermined lengths of the treated threads on the elements.

49. The method of manufacturing substantially stiff tooth brush units which comprises forming continuous lines of bristles from material including a plastic, forming substantially stiff supporting elements, and fastening predetermined lengths of the bristles to the supporting elements.

50. The method of manufacturing substantially stiff brush units which comprises directing continuous thread elements through a stiffening solution, drying the treated threads, forming substantially stiff supporting elements of deformable material, and then fastening predetermined lengths of the treated threads in openings in the supporting elements by deforming the latter to clinch around the ends of the threads.

51. The method of manufacturing substantially stiff brush units which comprises forming continuous lines of bristles from material including a plastic, forming substantially stiff supporting elements, and fastening predetermined lengths of the bristles in openings in the supporting elements by deforming the latter to clinch around the ends of the bristles.

52. The method of manufacturing substantially stiff brush units, which comprises forming continuous lines of bristles, collecting the bristles in clusters, fastening the ends of the clusters on a substantially stiff bristle-supporting element, and cutting the bristles in each cluster so as to shape the end of the latter by varying the length of the bristles therein.

53. In combination, means for feeding continuous bristle stock, means for collecting the bristles in clusters, means for fastening the end of each cluster on a substantially stiff supporting element, and means for shaping the clusters by cutting each to provide bristles therein of varying length.

54. In combination, means for feeding continuous bristle stock, means for fastening the ends of the stock in a bristle-supporting element, and means for severing the stock to provide bristles varying in length.

STANLEY V. LAUB.
HAROLD L. KEGLER.

CERTIFICATE OF CORRECTION.

Patent No. 2,035,709. March 31, 1936.

STANLEY V. LAUB, ET AL.

It is hereby certified that error appears in the printed specification of the above numbered patent requiring correction as follows: Page 10, second column, line 47, claim 38, for "feeding" read treating; and that the said Letters Patent should be read with this correction therein that the same may conform to the record of the case in the Patent Office.

Signed and sealed this 12th day of May, A. D. 1936.

Leslie Frazer (Seal) Acting Commissioner of Patents.